United States Patent [19]

Hitch

[11] Patent Number: 4,624,240
[45] Date of Patent: Nov. 25, 1986

[54] UNIVERSAL GAS BURNER WITH DUAL ADJUSTABLE FLEXIBLE VENTURI TUBE ASSEMBLY FOR GAS-FIRED BARBECUE GRILLS

[75] Inventor: Robert J. Hitch, Columbus, Ga.

[73] Assignee: W. C. Bradley Company, Columbus, Ga.

[21] Appl. No.: 769,162

[22] Filed: Aug. 23, 1985

Related U.S. Application Data

[63] Continuation-in-part of Ser. No. 672,470, Nov. 19, 1984.

[51] Int. Cl.⁴ ............................................. F24C 3/04
[52] U.S. Cl. ................................... 126/41 R; 138/121
[58] Field of Search ............... 126/41 R; 285/DIG. 4, 285/302; 138/121; 239/566, 567

[56] References Cited

U.S. PATENT DOCUMENTS 4,081,190  3/1978  Itzler ................................. 138/121
4,373,505  2/1983  Koziol ............................. 126/41 R
4,478,205  10/1984  Koziol ............................. 126/41 R
4,488,534  12/1984  Koziol ............................. 126/41 R

FOREIGN PATENT DOCUMENTS 2524492  12/1976  Fed. Rep. of Germany .... 126/39 R

Primary Examiner—Carroll B. Dority, Jr.
Attorney, Agent, or Firm—Newton, Hopkins & Ormsby

[57] ABSTRACT

A burner element for gas fired barbecue grills of varying designs and styles is rendered universal in its applicability to such grills by the provision therein of gas/air inlet openings in varied arrangements to enable connection of the burner element to flexible length adjustable venturi tubes in different modes of use, such as in a bent extended mode or a straight foreshortened mode. Inactive gas/air inlet openings of the burner element are covered during non-use. A burner system is provided which is compatible with grills having either post mounted or panel mounted burner controls.

5 Claims, 11 Drawing Figures

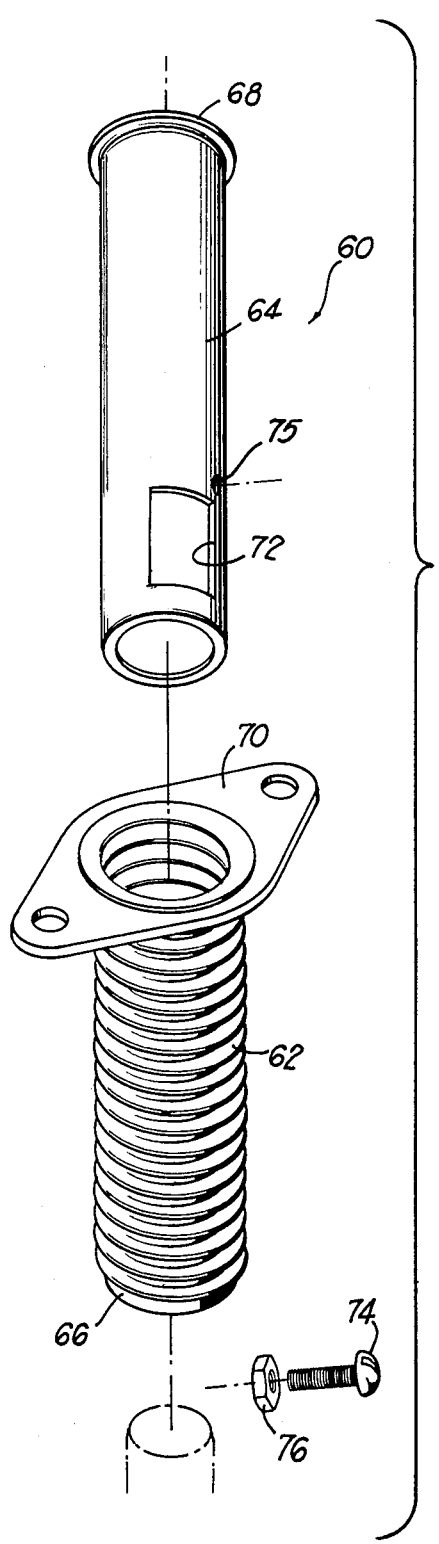
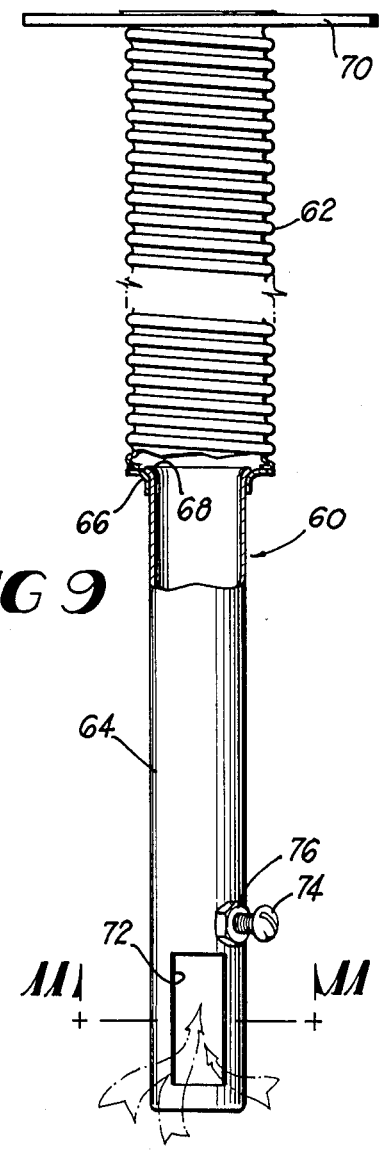
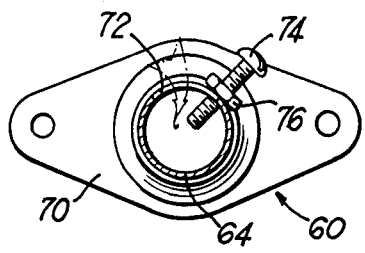
FIG 9
FIG 10
FIG 11

UNIVERSAL GAS BURNER WITH DUAL ADJUSTABLE FLEXIBLE VENTURI TUBE ASSEMBLY FOR GAS-FIRED BARBECUE GRILLS

This application is a continuation-in-part of prior co-pending application Ser. No. 672,470, filed Nov. 19, 1984, for "Universal Gas Burner and Dual Adjustable Flexible Venturi Tube Arrangement for Gas Barbecue Grills".

BACKGROUND OF THE INVENTION

Single and plural gas and air feeding venturi tubes for burner elements of gas fired barbecue grills are known in the prior art. A problem sometimes arises, however, in adapting more or less standard burner elements and their feeder tubes to grills which are varied in their designs and styles, such as those which have post mounted gas controls and those which have panel mounted controls. Accordingly, the principal objective of this invention is to provide a gas burner arrangement which is universally applicable to the largest possible range of gas fired barbecue grills whose design characteristics vary, and is not limited in use to a single grill style or design.

In accordance with the essence of the present invention, an essentially standard type of burner element employed with flexible length adjustable venturi tubes is provided with varying configurations or arrangements of gas/air inlet openings, whereby gas and air feeder venturi tubes can be operatively connected to the burner element at different locations thereon to facilitate arranging the feeder venturi tubes in different use modes dictated by the design construction or style of a particular gas fired grill. Idle inlet openings of the burner element are conveniently covered and sealed during periods of non-use. The gas/air feeder venturi tubes employed with the universal burner element are both flexible and longitudinally extensible and retractable to further enhance the universality of the burner system with respect to grills having differing design characteristics.

A further and more specific object of the invention is to provide a universal gas burner arrangement for barbecue grills characterized by simplicity and economy of construction, convenience of use and reliability of operation in connection with varying grill styles.

A further object of the invention is to provide a flexible and adjustable feeder venturi tube for universal burner element having an improved and simplified air inlet arrangement.

Other features and advantages of the invention will become apparent to those skilled in the art during the course of the following description.

BRIEF DESCRIPTION OF THE DRAWINGS

FIG. 9 is an exploded, perspective view of a feeder venturi tube assembly according to a third embodiment of the invention;

FIG. 10 is an assembled, side elevational view shown partly in cross-section, of the feeder venturi tube assembly according to the third embodiment; and FIG. 11 is a cross-sectional view taken from line 11—11 of FIG. 10.

DETAILED DESCRIPTION

Figure 1:
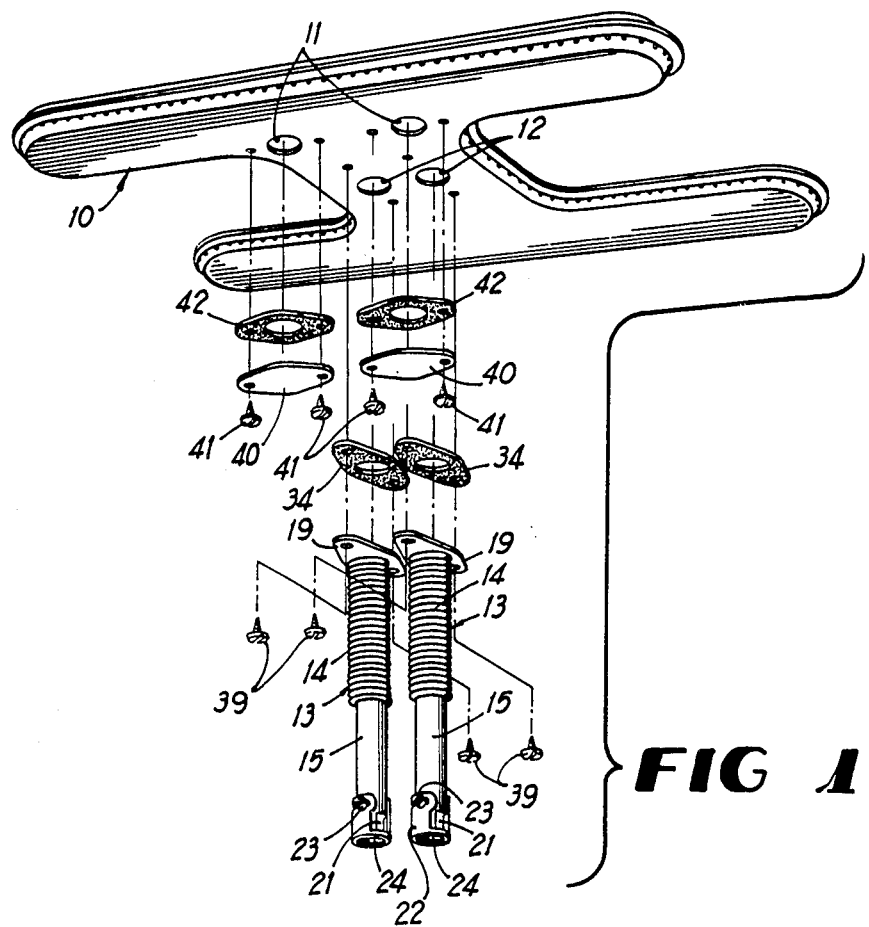
FIG. 1 is an exploded perspective view of a universal gas burner arrangement for gas fired barbecue grills according to the present invention.

Referring to the drawings in detail wherein like numerals designate like parts, a universal gas burner arrangement for gas fired barbecue grills of various styles and designs is shown in the drawings.

More particularly, a generally conventional gas burner element 10 is provided in its bottom wall with a varied arrangement of gas/air inlet openings, such as the separated sets of inlet openings 11 and 12. The set of openings 12, namely a pair of openings in the illustrated embodiment, is located centrally on the burner element 10, while the set 11 is located off-center and near one side portion of the burner element. The openings of the sets or pairs 11 and 12 may also have different spacings, as illustrated. In each set 11 and 12, at least one inlet opening is placed on each side of an internal partition, not shown, which divides the burner element 10 into two sections, according to conventional practice. It should be recognized that the number of sets of inlet openings in the burner element may vary in the invention as may the number of inlet openings within each set, so as to render the burner system universal to the greatest possible extent in its relationship to various designs and styles of gas fired grills.

Figure 2:
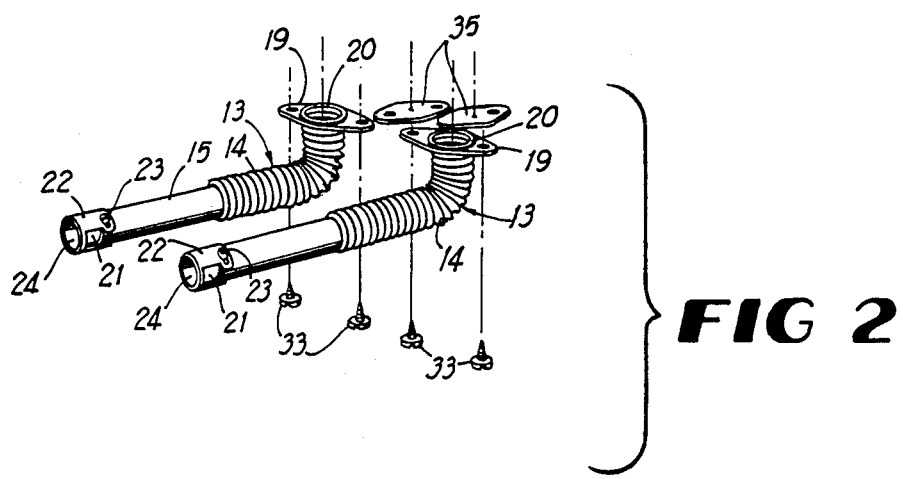
FIG. 2 is a similar view of gas/air feeder venturi tubes according to the invention in a flexed and extended use mode.
Figure 5:
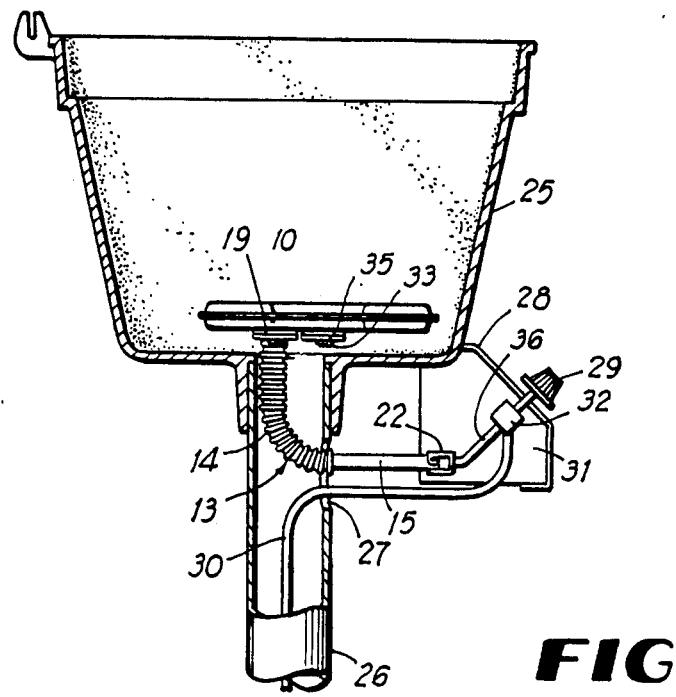
FIG. 5 is a side elevation, partly in cross section, showing a burner system according to the invention being used on a grill having panel mounted burner controls.
Figure 6:
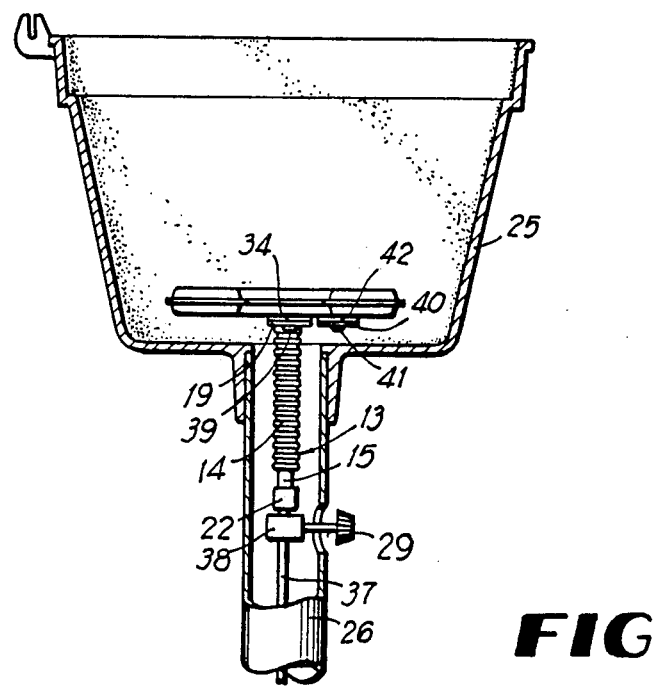
FIG. 6 is a similar view of the invention in use on a grill having post mounted burner controls.

The burner element 10 possessing the diverse sets of inlet openings 11 and 12 is utilized with gas/air feeder venturi tube assemblies 13. As will be further described, the tube assemblies 13 can operate in a flexible configuration as shown in FIGS. 2 and 5 or in a straight mode as shown in FIGS. 1, 6 and 10. This diversity of use is what enables the invention to satisfy the needs of different makes and styles of commercial gas fired grills on a much more universal basis than known prior art burner arrangements.

Figures 3, 4:
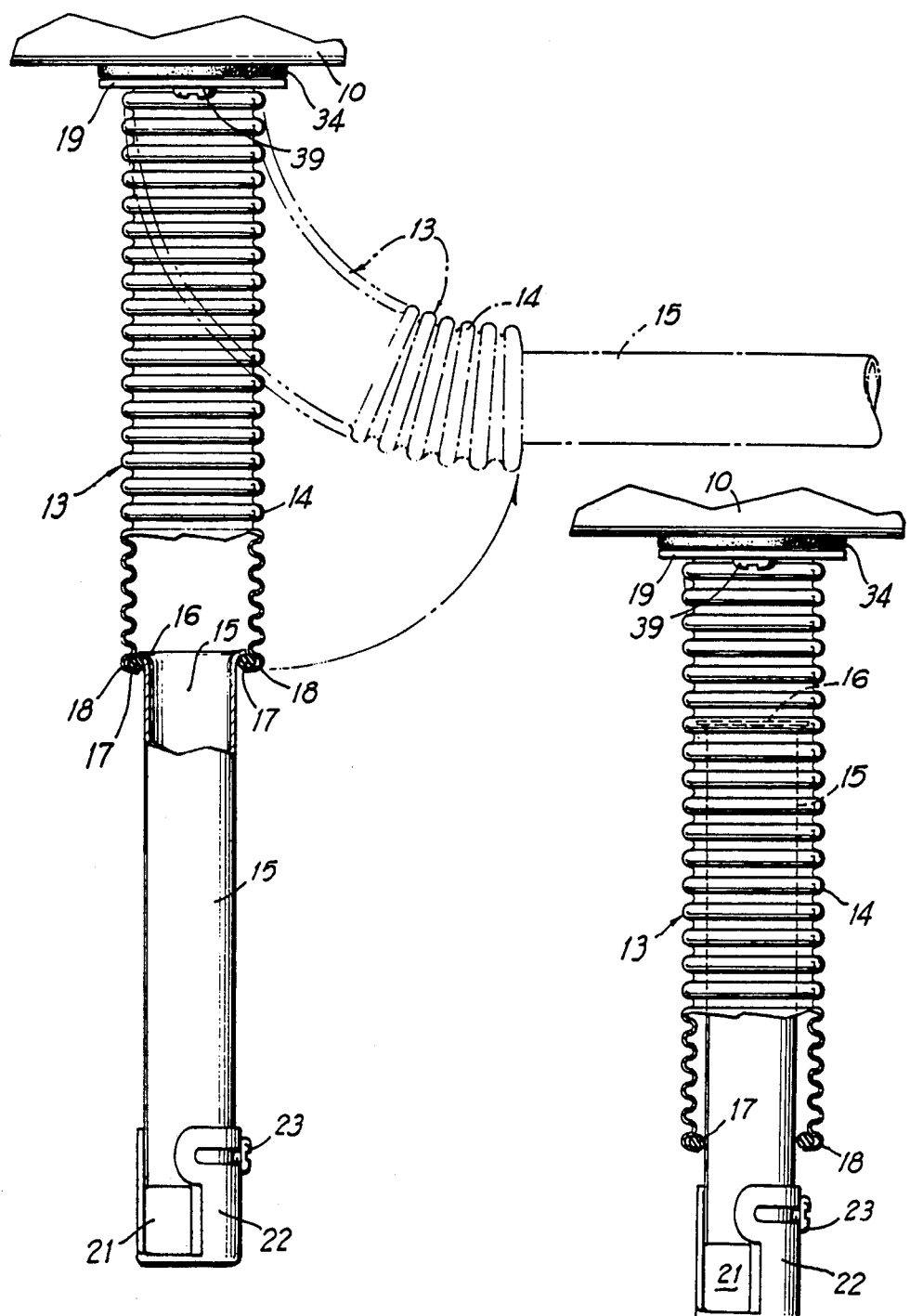
FIG. 3 is an enlarged side elevation, partly in cross section, showing a gas/air feeder venturi tube assembly constructed in accordance with one embodiment of the invention.
FIG. 4 is a similar view showing the venturi tube assembly in a retracted state to facilitate usage with gas burner controls on certain styles of grills.

In accordance with a first embodiment, FIGS. 3 and 4, each gas/air feeder venturi tube assembly 13 comprises a length 14 of flexible gas conduit of a known type, telescopically adjustably receiving therein a straight rigid venturi tube section 15 of cylindrical form having a top annular flange 16 of slightly smaller diameter than the bore of the flexible conduit 14. Optionally, a ring seal 17 can be captively held in one corrugation 18 of the flexible conduit 14, preferably although not necessarily the endmost corrugation. The ring seal 17 sealingly engages the periphery of the straight rigid venturi tube section 15 in all adjustable positions of the latter relative to the flexible conduit 14. As illustrated in FIGS. 3 and 4, the tube section 15 is extensible and retractable to any necessary degree to enable hooking up the tube assembly 13 with the gas controls of diverse types of grills, for example, the grills shown in FIGS. 5 and 6.

One end of the flexible conduit 14 is received in an opening of a rigid mounting flange or plate 19, connected to the flexible conduit by crimping, as indicated by the numeral 20 in FIG. 2.

The far end of each venturi tube section 15 in the embodiment shown in FIGS. 3 and 4 has a side air inlet opening 21 regulated by a circumferentially adjustable gate 22 having a locking screw 23. Gas enters each tube assembly 13 through the bore 24 of the venturi tube section 15.

When a grill having the configuration shown in FIG. 5 is involved, the tube assemblies 13 are employed with the universal burner element 10 in a bent or flexed mode, as shown. The grill in FIG. 5 includes a base 25 carried by a tubular vertical post 26 having a side opening 27 and a front inclined panel 28 adjacent to which a gas flame adjustment knob 29 is installed.

Gas is delivered upwardly through a tube 30 within the post 26, this tube extending outwardly through the opening 27 and into a chamber 31 beneath the panel 28, where the tube is connected to a gas regulator valve 32 controlled by the knob 29.

The tube mounting flanges 19 are secured by screws 33, FIG. 2, to the bottom wall burner element 10 so that the bores of flexible conduits 14 are in registration with the openings 11. Gaskets are placed between the flanges 19 and the burner bottom wall to prevent leakage. The burner inlet openings 12 are idle at this time, and are closed by cover plates 35, FIG. 2, secured by screws, with gaskets placed between the cover plates 35 and the bottom wall of burner element 10.

With reference to FIG. 5, the flexed conduits 14 extend downwardly into post 26 and the rigid venturi tube sections 15 assume substantially horizontal positions and extend outwardly from the post 26 for connection in the chamber 31 with a gas delivery tube 36 extending rearwardly from the gas valve 32. The tubes 36 and 15 are coupled in a conventional manner. The ready extendability and retractability of the tube section 15 relative to the flexible conduit 14 facilitates making the burner installation on the style of barbecue grill shown in FIG. 5 as well as on other types of grills having panel mounted burner controls.

When the universal burner system according to the invention is used with a grill of the type shown in FIG. 6 having post mounted burner controls, the tube assemblies 13 are employed in a straight mode. The grill shown in FIG. 6 has its base 25 supported by the post 26, as previously described, but the gas flame regulator 29 is located at one side of the post 26 instead of being adjacent to a panel. Gas is delivered upwardly through a vertical tube 37 in the post 26 to a gas valve 38, also within the post, controlled by the knob 29. The valve 38 is conventionally coupled with the straight venturi tube section 15 on each tube assembly 13. Again, the length adjustability of the assembly 13 or assemblies greatly facilitates the installation of the burner system on a grill of the type shown in FIG. 6 or any similar grill type. As shown in FIG. 6, the venturi tube sections 15 are substantially fully retracted into the flexible conduit 14.

In this mode of use, the tube assembly flanges 19 are secured by screws 39, FIG. 1, to the bottom wall of burner element 10, with the bores of flexible conduits 14 in registration with the inlet openings 12. Gaskets 34 are placed between the flanges 19 and the bottom wall of the burner element. The idle inlet openings 11 are now covered by plates 40 secured to the burner element bottom wall by screws 41, with gaskets 42 placed between the plates 40 and the burner element.

Figure 7:
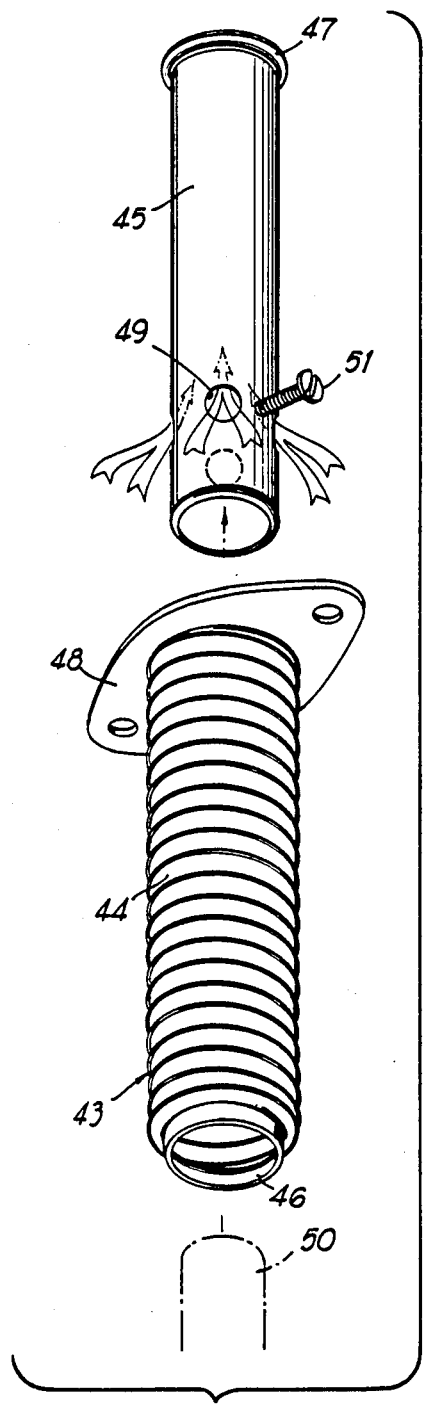
FIG. 7 is an exploded perspective view of a feeder venturi tube assembly according to a second embodiment of the invention.
Figure 8:
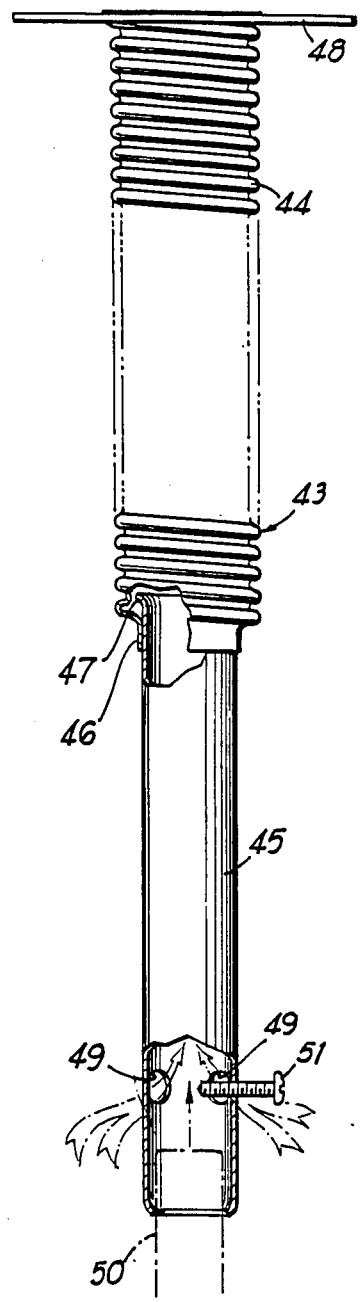
FIG. 8 is an assembled side elevation, partly in section, of the feeder venturi tube assembly according to the second embodiment.

A second embodiment of the gas/air feeder tube assembly according to the invention is indicated by the numeral 43 in FIGS. 7 and 8. This second embodiment is somewhat simpler and more economical than the tube assembly 13 and is equally applicable to the universal burner element 10. The tube assembly 43 includes a corrugated flexible conduit section 44 of the required length and a co-acting straight rigid venturi tube section 45 having length adjustable telescoping engagement within the flexible conduit 44. The conduit 44 has an end reduced diameter cylindrical sleeve extension 46 which slidably receives the cylindrical tube section 45, the latter having an end flange 47 which limits the outward extension of the venturi tube section 45 from the flexible conduit section 44.

The other end of conduit section 44 has a mounting flange or plate 48 connected therewith by crimping as previously described in connection with the tube assembly 14. The venturi tube section 45 has fixed circumferentially spaced air inlet openings 49 near the end which is connected to the gas delivery tube 50. A spoiler screw or screws 51 is provided on the tube section 45 at the location of the openings 49 to act on the air streams entering the tube assembly through the openings 49.

The tube assembly 43 depicted in FIGS. 7 and 8 is employed with the universal burner element 10 according to the invention in the identical manner previously described in connection with the tube assembly 14.

In the third embodiment shown in FIGS. 9 through 11, tube assembly 60 includes a corrugated flexible conduit section 62 which telescopically receives a co-acting, straight, rigid venturi tube section 64. Conduit section 62 has a reduced diameter, cylindrical sleeve extension 66 at one end thereof which slidably receives the venturi tube section 64. The latter has a flanged end portion 68 for limiting the outward extension of the venturi tube section 64 with respect to the flexible conduit section 62.

Conduit section 62 has a mounting flange or plate 70 secured to the end opposite sleeve extension 66, connected thereto in any suitable manner, as by crimping, described in connection with the previous tube assembly embodiment 13 and 43.

Venturi tube section 64 has air inlet means such as opening 72 near the end opposite flanged end portion 68. Spoiler means such as screw 74 is provided near opening 72 to act on or spoil the gas/air stream passing through the venturi tube section 64 for causing efficient mixing of the air and gas delivered to the burner element. The screw is disposed in hole 75 and may have a nut 76 provided adjacent tube section 64 for securing or fixing the desired position of the screw, thereby permitting optimum adjustment. Thus, in this embodiment, opening 72 is fixed and non-adjustable.

Tube assembly 60 is also employed with the universal burner element 10 in the manner previously described with respect to tube assembly 13.

It may now be seen that the invention fully accomplishes the objective of providing a substantially universal burner system for gas fired grills of various makes and styles, so that the necessity for custom designing of a burner system for each and every grill style and configuration is eliminated to the greatest possible extent.

While an embodiment of a universal gas burner with dual-adjustable flexible venturi tube assembly for gas-fired barbecue grills and several modifications thereof have been shown and described in detail herein, various other changes and modifications may be made without departing from the scope of the present invention.

I claim:

1. A flexible and length adjustable gas/air feeder venturi tube assembly for connecting a gas burner element with gas controls on diverse types of gas fired barbecue grills, said assembly comprising a flexible conduit section having a substantially flat mounting flange secured to one end thereof, a straight cylindrical substantially rigid venturi tube section engaged with the flexible conduit section, said flexible conduit section having a reduced diameter cylindrical sleeve extension on one end thereof telescopically and slidably receiving said venturi section therein, a flange on one end of the venturi tube section of somewhat larger diameter than the diameter of said sleeve extension but smaller than the internal diameter of said flexible conduit section, air inlet means on said venturi tube section near the end thereof away from said flexible conduit section, and a spoiler means disposed on and extending into said venturi tube section, away from said air inlet means, for promoting intermingling of the gas with the air stream entering said air inlet means.

2. A flexible and length adjustable venturi tube assembly as defined in claim 1 in which said spoiler means is adjustable for length and said air inlet means has a fixed opening.

3. A flexible and length adjustable venturi tube assembly as defined in claim 1 in which said straight tube section and said flexible conduit section have sealing means disposed therebetween.

4. A flexible and length adjustable venturi tube assembly as defined in claim 1 in which said air stream spoiler means disposed near said air inlet means is selectively adjustable for extending into the air flow passing through said rigid venturi tube section.

5. A flexible and length adjustable venturi tube assembly as defined in claim 4 in which said spoiler means has a securing means for fixing the position of said spoiler means.

* * * * *